Dec. 20, 1955
C. VAN CARLILE
2,727,756
TRACTOR HITCH ADJUSTER
Filed Aug. 29, 1952
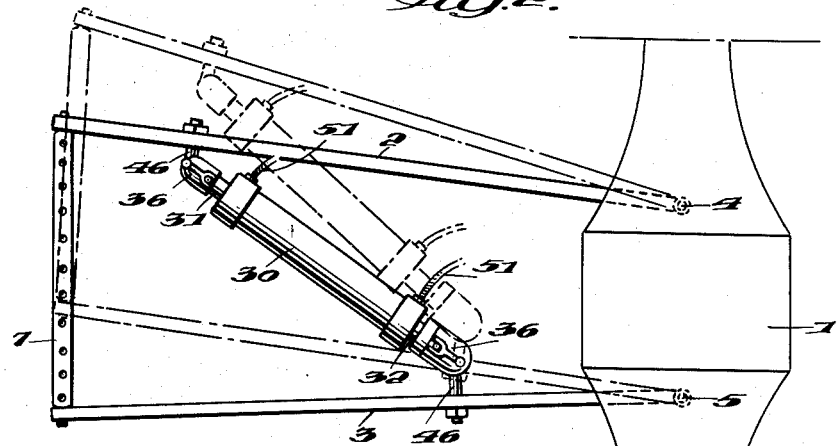
INVENTOR
CHARLEY VAN CARLILE,
BY Leech & Radue
ATTORNEYS

2,727,756
TRACTOR HITCH ADJUSTER

Charley van Carlile, Hinton, Okla.

Application August 29, 1952, Serial No. 307,131

2 Claims. (Cl. 280—468)

This invention relates to a draft adjuster particularly adapted to be applied to a conventional type tractor hitch to afford means for adjusting and maintaining the angularity of the hitch with respect to the tractor axis.

One object of this invention is to provide a draft adjuster which may be readily and conveniently applied to any conventional tractor hitch to vary the angular relationship of the hitch components with respect to the tractor axis.

Another object is to provide a draft adjuster which has a wide range of adjustability limited only by the proportions of the components of the device.

A further object is to provide a draft adjuster which is easy and simple to install and operate.

Still another object is the provision of a draft adjuster which has a minimum number of working parts and the ability to withstand the hard use encountered in normal operation.

These and other objects and advantages will be apparent from the following description and drawing wherein:

Fig. 1 is a top plan view of the draft adjuster as applied to a conventional tractor hitch;

Fig. 2 is a top plan view of another embodiment of the draft adjuster;

Fig. 3 is a vertical section taken along line 3—3 of Fig. 1 showing one of the clamping means for securing the draft adjuster to the hitch;

Fig. 4 is a front elevation of a quick opening and closing socket assembly adapted to cooperate with a ball member to afford another means of securing the draft adjuster to the hitch;

Fig. 5 is a side elevation of the quick opening and closing socket assembly of Fig. 4; and Fig. 6 is a side elevation of the ball member of the ball and socket connection mentioned above.

Referring to the various figures of the drawing wherein similar reference numerals designate similar parts throughout, the rear housing portion of the tractor to which the hitch is attached is designated as member 1.

A conventional form of tractor hitch as shown in Figs. 1 and 2 comprises draw bars 2 and 3 pivotally mounted on 1 at transversely spaced points 4 and 5 respectively and cross bar 7 pivoted to and carried between the outer extremities of draw bars 2 and 3. Cross bar 7 has a plurality of spaced holes 8 extending throughout its length to afford means for securing the drawn device thereto.

The draft adjuster 10 as shown in Fig. 1 comprises an operating wheel 12 having a shaft 14 extending centrally therethrough with the opposite sections 15 and 16 of this shaft being oppositely threaded. Internally threaded bar members 17 and 18 are threadedly mounted on shaft sections 15 and 16 respectively. These bar members are pivotally connected to bracket assemblies 20 and 22 which are in turn secured to draw bars 2 and 3. Since these bracket assemblies are identical only one will be described in detail. As shown in Figs. 1 and 3 bracket assembly 20 comprises an inverted U-shaped member 24 adapted to fit down over draw bar 3 and having an apertured flange 25 extending from one side thereof and adapted to receive a pin or bolt 26 to pivotally hold bar member 17 thereto. A pair of holding screws 27 are threaded into the side of the U-shaped member opposite to the side with the flange to hold the U-shaped member 24 in position on the draw bar.

In use, the draft adjuster is assembled to a conventional tractor hitch so as to be in angular relation to the cross bar 7, as shown in Fig. 1. The bracket assemblies 20 and 22 are fitted over the draw bars 2 and 3, and the screws 27 tightened to hold the adjuster in position. The operating wheel 12 may be rotated to vary the overall length of the adjuster to thereby change the angular relation of the various hitch components as shown by the dotted lines in Fig. 1. As previously mentioned the threads on the shaft 14 are opposite so that rotation of the operating wheel in one direction will cause both bar members to move inwardly or outwardly in unison depending on the direction of rotation of shaft 14.

Another embodiment of this invention is shown in Fig. 2 wherein a standardized hydraulic cylinder 30 having a fixed end 31 and an extensible end 32 is secured to draw bars 2 and 3 to produce the same results achieved by the adjuster previously described and shown in Fig. 1.

It will be noted that somewhat different means have been furnished for mounting the embodiment shown in Fig. 2. This mounting means operates on the ball and socket principle with a quick opening and closing arrangement. As shown in Figs. 4 and 5, the quick opening and closing socket assembly 36 comprises symmetrical upper and lower clamps 37 and 38 with hemispherical recessed portions 39 and 40 adapted to receive a ball member. The after portion of clamps 37 and 38 have a hole therein to accommodate a pin 42, which also passes through an apertured end connection of the hydraulic cylinder 30 and secures the same rigidly to the socket. Pin 42 carries a pivotally mounted cam faced lever 44 which is so shaped as to produce the desired quick opening and closing of the clamps 37 and 38.

The ball member 46 is shown in Fig. 6 and comprises a ball portion 47 having a stud 48 extending therefrom, the end portion 49 of which is reduced in size and threaded to receive a nut for holding the ball member 46 on and laterally spaced from the draw bar as shown in Fig. 2.

Referring to Fig. 2, a socket assembly 36 is rigidly secured to an apertured connection at each end of hydraulic cylinder 30. These socket assemblies are in turn connected to ball members 46 positioned on draw bars 2 and 3 to maintain the hydraulic adjuster in position on the tractor hitch.

Connections 50, 51 are located at the ends of the cylinder to allow the introduction of the operating fluid. The flow of the operating fluid is controlled by a standard valve arrangement and is therefore not shown on the drawing. Of course pump means are also included in the system for maintaining fluid pressure.

The operation of this embodiment is essentially the same as that of the first embodiment but the controls may be placed in a more convenient position for access by the operator. Liquid is introduced into the cylinder to vary the length of the adjuster and thereby change the angular relationship of the tractor hitch components as indicated by the dotted lines in Fig. 2.

The device of this invention is particularly useful in varying the draft angle of the hitch so as to compensate for side draft encountered when working on the side of a hill. Obviously it would also be useful in varying the lateral displacement of the cross bar for any type of work where a close lateral control is necessary.

What I claim as my invention and desire to secure by Letters Patent of the United States is:

1. An adjustable tractor hitch comprising two draw bars of equal length adapted for pivotally mounting in spaced relation on the rear portion of a tractor, a cross bar pivotally secured by its ends to and between the outer ends of the draw bars, a lengthwise adjustable hydraulic cylinder assembly pivotally secured by its ends to and between the two draw bars and at different distances from the cross bar pivot ends so that variations in the length of the hydraulic cylinder assembly will change the angular relationship of the draw bars and cross bar with respect to each other and to the tractor, and means for supplying fluid under pressure into the hydraulic cylinder to adjust the overall length of the hydraulic cylinder assembly.

2. The invention as described in claim 1 wherein the lengthwise adjustable hydraulic assembly comprises, a hydraulic cylinder, an extensible member having a portion thereof slidably positioned within the cylinder and a portion projecting beyond the end of the cylinder, and ball and socket means for pivotally securing the remote ends of the assembly to the respective draw bars, said ball and socket means each comprising a socket member secured to each end of the hydraulic assembly and a ball engaged by each socket member, each ball being secured to a respective draw bar.

References Cited in the file of this patent

UNITED STATES PATENTS

| | | |
|---|---|---|
| 2,155,379 | Albertson | Apr. 25, 1939 |
| 2,494,757 | Hansen | Jan. 17, 1950 |
| 2,496,474 | Hyman | Feb. 7, 1950 |
| 2,599,617 | Davis | June 10, 1952 |
| 2,625,232 | Lado | Jan. 13, 1953 |